United States Patent  (10) Patent No.: US 7,770,173 B2
Farrell et al.  (45) Date of Patent: Aug. 3, 2010

(54) SYSTEM FOR DYNAMIC PROCESSOR ENABLEMENT

(75) Inventors: Charles Richard Farrell, Rochester, MN (US); Curtis Duane Kronlund, Cottage Grove, MN (US); Scott Alan Moore, Rochester, MN (US); Gregory Allan Olson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1583 days.

(21) Appl. No.: 11/050,292

(22) Filed: Feb. 3, 2005

(65) Prior Publication Data

US 2006/0174247 A1  Aug. 3, 2006

(51) Int. Cl.
  *G06F 9/46* (2006.01)
(52) U.S. Cl. ...................... 718/104; 718/105
(58) Field of Classification Search ................ 718/104, 718/105
  See application file for complete search history.

(56) References Cited

U.S. PATENT DOCUMENTS

| | | | | |
|---|---|---|---|---|
| 5,835,765 | A * | 11/1998 | Matsumoto | 718/102 |
| 6,006,248 | A * | 12/1999 | Nagae | 718/105 |
| 6,148,324 | A * | 11/2000 | Ransom et al. | 718/105 |
| 6,269,274 | B1 * | 7/2001 | Steinman et al. | 700/28 |
| 7,143,222 | B2 * | 11/2006 | Fisher et al. | 710/200 |
| 7,203,943 | B2 * | 4/2007 | Shaffer | 718/104 |
| 7,290,259 | B2 * | 10/2007 | Tanaka et al. | 718/1 |
| 7,346,693 | B2 * | 3/2008 | Shimada | 709/228 |
| 7,353,410 | B2 * | 4/2008 | Desai et al. | 713/300 |
| 7,383,548 | B2 * | 6/2008 | Boon et al. | 718/102 |
| 7,450,928 | B1 * | 11/2008 | Henry et al. | 455/408 |
| 7,475,285 | B2 * | 1/2009 | Wang et al. | 714/13 |
| 7,480,914 | B2 * | 1/2009 | Creamer et al. | 718/105 |
| 2003/0055863 | A1 * | 3/2003 | Spiegel et al. | 709/104 |
| 2003/0177165 | A1 * | 9/2003 | Bradley et al. | 709/105 |
| 2003/0187910 | A1 * | 10/2003 | Furukawa et al. | 709/104 |
| 2003/0233391 | A1 * | 12/2003 | Crawford et al. | 709/104 |
| 2005/0138168 | A1 * | 6/2005 | Hoffman et al. | 709/224 |
| 2005/0155032 | A1 * | 7/2005 | Schantz | 718/100 |
| 2006/0090162 | A1 * | 4/2006 | Flores et al. | 718/104 |
| 2006/0101470 | A1 * | 5/2006 | Swanberg | 718/105 |
| 2006/0150190 | A1 * | 7/2006 | Gusler et al. | 718/105 |

* cited by examiner

*Primary Examiner*—Meng-Ai An
*Assistant Examiner*—Adam Lee
(74) *Attorney, Agent, or Firm*—Wood, Herron & Evans, LLP

(57) ABSTRACT

An apparatus, program product and method improve management of available computing resources by adjusting use of the resource over a first interval according to actual use of the resource during a second interval. This feature enables a computing resource to exceed its normal limits during the first interval of operation. Use during the second interval may be limited to balance out the burst, or excessive resource usage of the first interval.

18 Claims, 4 Drawing Sheets

SYSTEM FOR DYNAMIC PROCESSOR ENABLEMENT

FIELD OF THE INVENTION

The present invention relates to computing systems, and more particularly, to managing access to processing, memory and other resources of computer systems.

BACKGROUND OF THE INVENTION

Computer manufacturers often place artificial constraints on the processing power of computer systems to enable multiple price points on lower end systems. Programmatically limiting the capability of a standard microchip set is sometimes more cost effective than manufacturing different microchip sets for different computers. As such, the computing industry uses the artificial limitations to profile computer products to different market demographics. For instance, a computer having a limited processor can be sold at a lower cost to a consumer than another computer having more or all of a microchip processor enabled. Different gradations of computer processor capabilities can thus be tailored to different markets.

The processor limitations are often designed and designated according to a percentage indicative of processor's limited capability relative to that of the standard, unlimited processor. This percentage is essentially an expression of how much a processor may be used during a preset unit of time, or interval. For instance, a user may purchase a computer having a 0.25 processor capability. As such, the processor of that computer can be used twenty-five percent of a given time interval. If the interval is ten milliseconds, for example, then the processor of the 0.25 computer can be active for up to 2.5 milliseconds of that ten millisecond interval. While the processor may be utilized less than its allocated percentage in a given interval, it cannot exceed its limits, e.g., 2.5 milliseconds for the interval.

While such performance caps do not significantly impact response times of small tasks, such as certain read or caching applications, response times can be undesirable for processor intensive tasks when response times are critical. For instance, a computer may require multiple intervals of the reduced processor capacity to complete certain server applications. These multiple intervals generally mean poor response times, e.g., taking four times longer than would the same task with a fully enabled processor. This problem becomes exacerbated when multiple users submit tasks concurrently. Poor response times, in turn, may translate into consumer frustration and a reluctance to purchase capped processor computers.

There is consequently a need for an improved manner of addressing processing tasks within a computing systems having capped processing capabilities.

SUMMARY OF THE INVENTION

The present invention provides an improved apparatus, method and program product configured to improve management of computing resources by adjusting available use of the resource over a second interval according to actual use of the resource during a first interval. The first interval may precede or be subsequent to the second interval. These features enable a computing resource to, for instance, exceed its normal limits during the first or second intervals of operation. Use during a second interval, for instance, may be limited to balance out a burst, or excessive resource use of the first interval.

In one aspect, the system uses a ledger to maintain the balance of resource usage relative to a predetermined reference value. The ledger balance may be decremented according to the actual use and be compared to the reference value. One such reference value may comprise a processing unit allocation for an interval. Another such reference value may comprise a balance count. In either case, the ledger balance may be compared to the reference value, and according to the comparison, the use of the resource during the second and/or a subsequent interval may be restricted. For instance, the use during the second period may be limited to a level ranging between normal and no use.

Conversely, where the actual use during the first interval was less than the reference value, the ledger may carry over a credit balance that may be utilized during the second interval. The predetermined limit for the second interval may thus be exceeded, e.g., up to an amount specified in the balance of the ledger.

The above burst features may enable dynamic response to task requirements, allowing processors to essentially borrow resource time from the past or future in order to accommodate a present need. The features thus preserve capacity over several intervals, while allowing users to benefit in the short term, as if an entire processor was activated. The features more comprehensively and fairly make use of available resource time purchased by the user. The dynamic burst features consequently promote more purchases and use of resource limited computers.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Features of the present invention include an apparatus, program product and method for enabling dynamic utilization of otherwise capped computing resources over a given interval. To this end, aspects of the invention use burst and balance processor distribution. A processor ledger is used to keep track of processor usage, as well as a ledger interval. The ledger interval generally corresponds to a span of time in which the ledger has to achieve a zero balance. The system can reclaim unused cycles from earlier on in a ledger interval. The system can further borrow cycles from the future. The primary metric to tell how much processor power can be borrowed is processor utilization. The busier the processor, the less aggressive the system may be about loaning out future cycles.

As such, aspects of the invention allow a user to either cache in unused cycles from earlier intervals, or borrow cycles from the future to get a burst of uninterrupted processor usage. The ledger interval is tunable, which allows the system to automatically choose an interval in which the books, i.e., resource utilization over a ledger interval, may be balanced. Thus, the system typically has a sequence of time intervals comprising the ledger interval to balance resource utilization. In this manner, embodiments consistent with the invention adjust available resource use over a given interval according to actual use of the resource during a second interval. These features are discussed more particularly in the hardware and software descriptions that follow.

Hardware and Software Environment

Figure 1:
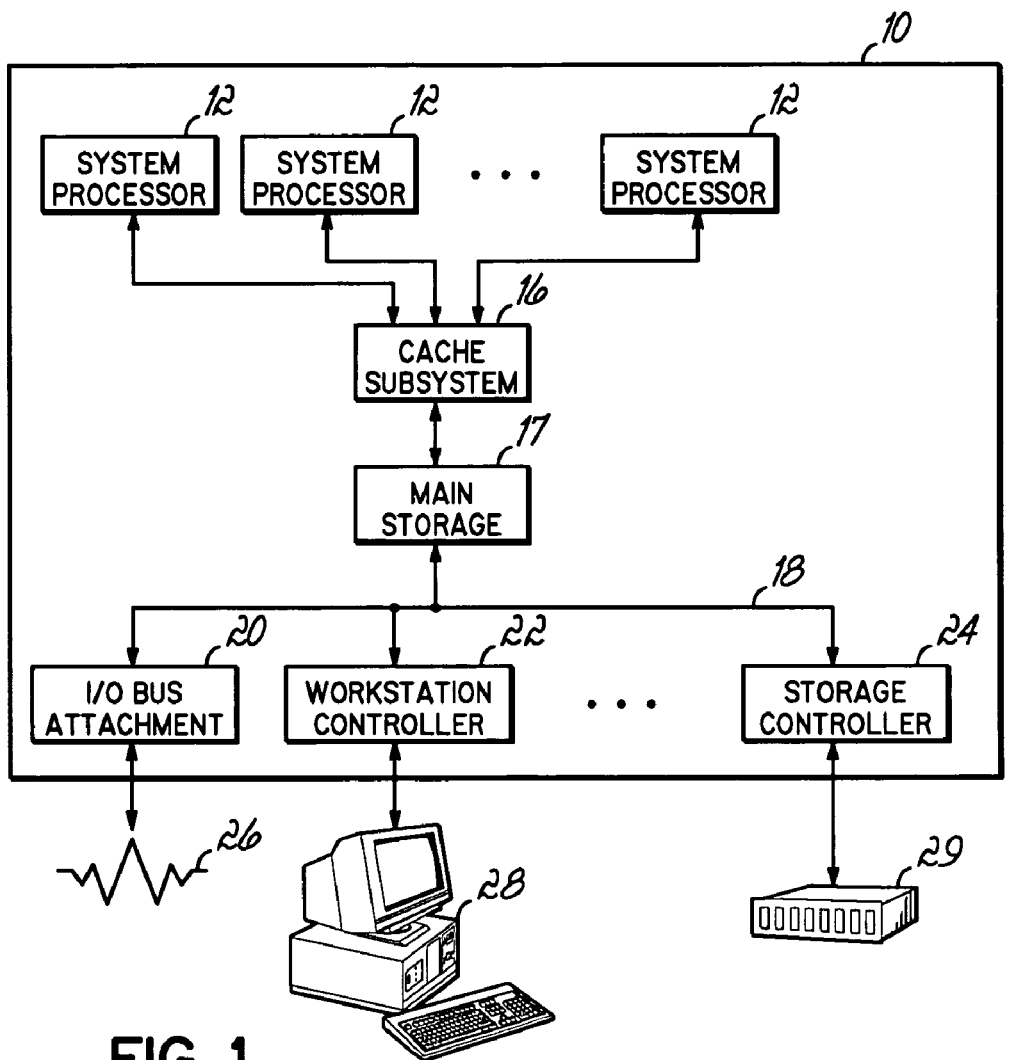
FIG. 1 is a block diagram of a computer consistent with the invention.

Turning more particularly to the drawings, wherein like numbers denote like parts throughout the several views, FIG. 1 illustrates a data processing apparatus 10 consistent with the invention. Apparatus 10 generically represents, for example, any of a number of multi-user computer systems such as a network server, a midrange computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as an iSeries computer available from International Business Machines Corporation.

Apparatus 10 generally includes one or more physical processors 12 coupled to a memory subsystem including main storage 17, e.g., an array of dynamic random access memory (DRAM). Where desired, the physical processors may be multithreaded. Also illustrated as interposed between physical processors 12 and main storage 17 is a cache subsystem 16, typically including one or more levels of data, instruction and/or combination caches, with certain caches either serving individual processors or multiple processors as is well known in the art.

Furthermore, main storage 17 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 29.

Figure 2:
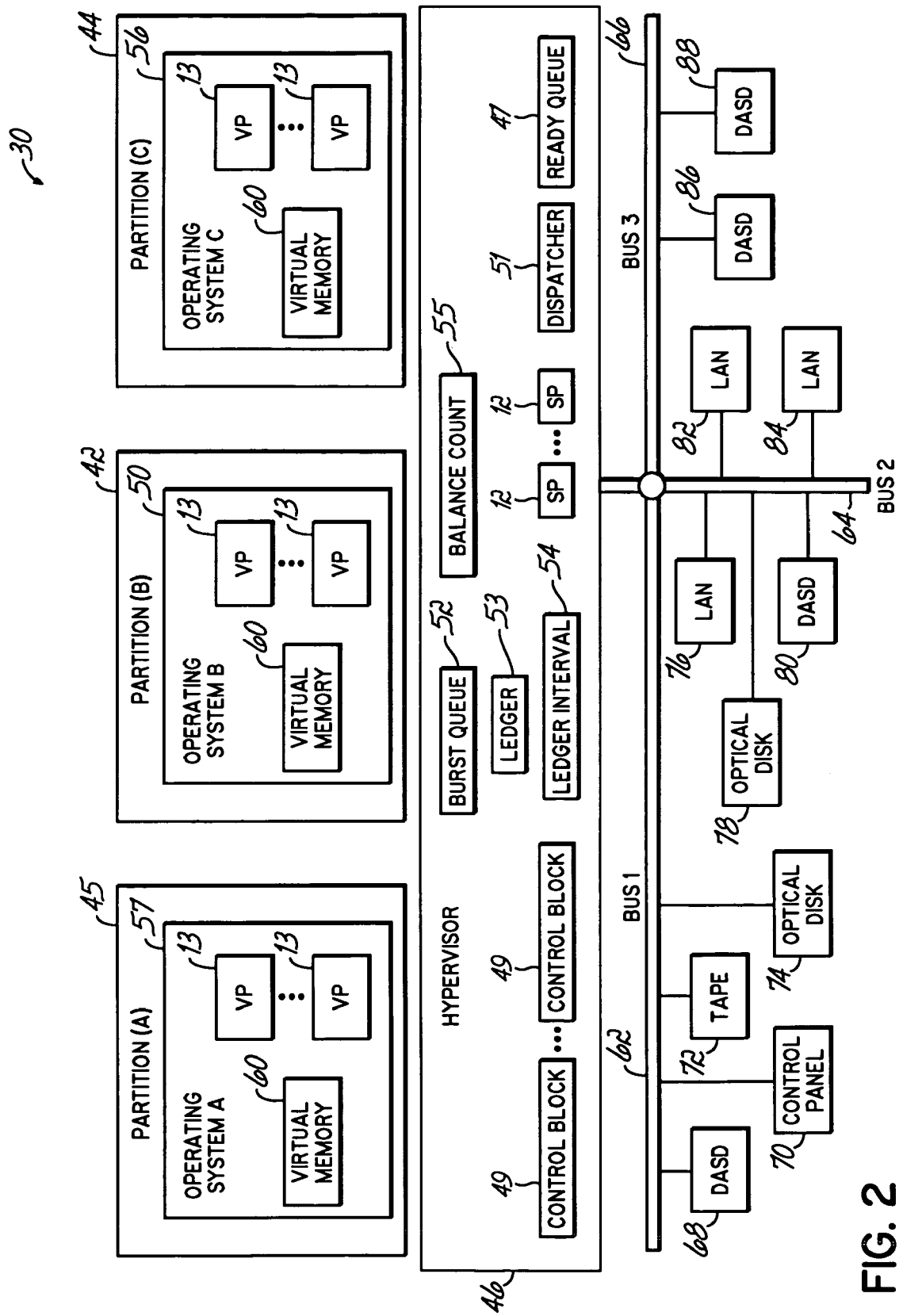
FIG. 2 is a block diagram of the primary software components and resources of the computer of FIG. 1.

FIG. 2 illustrates in greater detail the primary software components and resources utilized in implementing a logically partitioned environment consistent with the system 10 shown in FIG. 1. FIG. 2 generally shows a computing architecture characterized as a "virtual machine" design, developed by International Business Machines Corporation. The system 30 includes a plurality of partitions, e.g., partitions 42, 44, 45 that share common processing resources among multiple processes. Such an architecture may rely upon a single computing machine having one or more physical processors 12, or central processing units (CPU's). The physical processors 12 may execute software configured to simulate multiple virtual processors 13.

The partitions 42, 44, 45 may logically comprise a portion of a system's physical processors 12, memory 68 and other resources as assigned by an administrator. Each partition typically hosts an operating system 50, 56, 57 and may have multiple virtual processors 13. In this manner, each partition 42, 44, 45 operates largely as if it is a separate computer.

An underlying program called a hypervisor 46, or partition manager, uses this scheme to assign physical resources to each partition 42, 44, 45. For instance, the hypervisor 46 may intercept requests for resources from operating systems 50, 56, 57 to globally share and allocate them. If the partitions 42, 44, 45 are sharing processors, the hypervisor 46 allocates physical processor cycles between the virtual processors 13 of the partitions 42, 44, 45 sharing the physical processor 12.

Each operating system 50, 56 and 57 controls the primary operations of its respective logical partition 42, 44, 45 in the same manner as the operating system of a non-partitioned computer. Each logical partition 42, 44, 45 may execute in a separate memory space, represented by virtual memory 60. Moreover, each logical partition 42, 44, 45 is statically and/or dynamically allocated a portion of the available resources in apparatus 10. For example and as discussed herein, each logical partition may share one or more physical processors 12, as well as a portion of the available memory space for use in virtual memory 60. In this manner, a given processor may be utilized by more than one logical partition.

The hypervisor 46 may manage the dispatching of virtual processors to physical processors on a dispatch list, or ready queue 47. The ready queue 47 comprises memory that includes a list of virtual processors having work that is waiting to be dispatched on a physical processor 12. The hypervisor 46 shown in FIG. 2 also includes physical processors 12, in addition to processor control blocks 49. The processor control blocks 49 comprise memory that includes a list of virtual processors waiting for access on a particular physical processor 12.

The hypervisor 46 further includes a burst mode tasking dispatching queue 52. The burst mode dispatching queue 52 maintains a list of active tasks that can be dispatched during burst mode processing. A task is linked onto this queue 52 based on the priority assigned to the task, as well as a system configuration parameter that defines what is the minimum priority required for being eligible for dispatching during burst mode processing. The hypervisor 46 further includes a ledger 53 having a balance, as well as a balance count 54.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to a partition.

Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 may be implemented in a number of manners, including using various computer software applications, routines, components, programs, objects, modules, data structures, etc., referred to hereinafter as "computer programs," "programs" or "program code." Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable signal bearing medium used to actually carry out the distribution. Examples of computer readable signal bearing media include, but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Though not shown in FIG. 2, for instance, one skilled in the art will appreciate that other partitions may be included within other embodiments, including a partition that comprises part of the hypervisor 46. This hypervisor partition functions in many ways like the conventional partitions 42, 44, 45 (and operating systems), but have no user interface for the customer to protect it from failures that might otherwise come about through user interaction. Furthermore, one skilled in the art will appreciate that embodiments of the invention may further have application within non-partitioned environments. Moreover, while three logical partitions 42, 44, 45 are shown in FIG. 2, one skilled in the art will appreciate that more or fewer partitions may be implemented as needed. Those skilled in the art will thus recognize that other alternative hardware and/or software environments may be used without departing from the scope of the invention.

Processes for Burst Allocation of Resources

Figure 3:
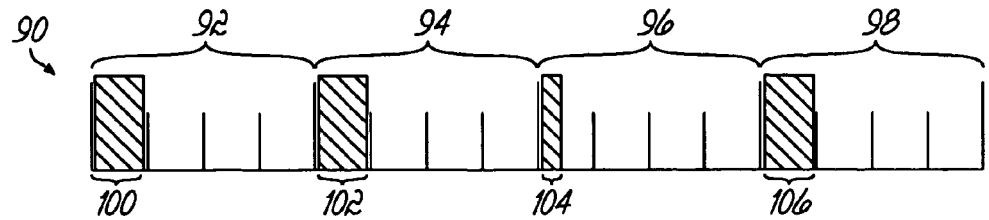
FIG. 3 shows a sequence of time intervals during which a processor of the systems of FIGS. 1 or 2 may be active.

FIG. 3 shows a sequence 90 of intervals 92, 94, 96, 98 of time during which a processor 12 of the systems 10, 30 of FIGS. 1 or 2 may be active. The processor 12 executing in FIG. 3 has a predetermined, or capped, limit of about twenty-five percent. The processor 12 may further not be operating in burst mode in FIG. 3. Usage 100, 102, 104, 106 during the respective intervals 92, 94, 96, 98 consequently does not exceed twenty-five percent of each interval. Usage 104 of interval 96, in fact, uses less than its allocated twenty-five percent.

Figure 4:
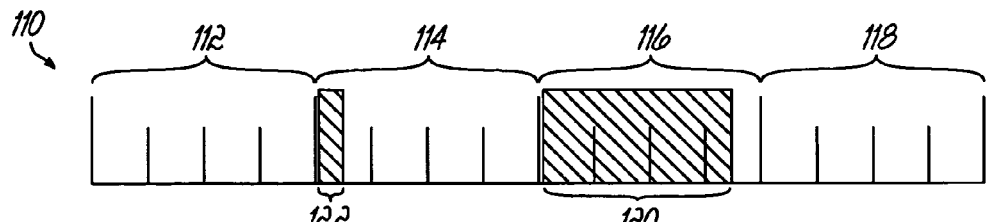
FIG. 4 shows a sequence of time intervals during which a processor of the systems of FIGS. 1 and 2 executes in burst mode.

FIG. 4 shows the processor 12 of the systems 10, 30 of FIGS. 1 and 2 executing in burst mode during a sequence 110 of time intervals 112, 114, 116, 118. While the processor 12 in FIG. 4 may be capped at twenty-five percent, similar to the constraints of FIG. 3, the processor 12 in FIG. 4 is operating in burst mode. The processor 12 may thus exceed a capped, predetermined limit for a given interval 116. For instance, processor utilization may exceed the artificial constraint limitation during the interval 116 to dynamically respond to a processor intensive and time critical task. Put another way, usage 120 of the interval 116 exceeds the normal twenty-five percent usage limit of an interval to accommodate a need. As shown in FIG. 4, the processor 12 may operate as if nearly fully enabled for most of the interval 116.

The system 30 allows the processor 12 to borrow from past or future availability of processor usage time in order to accommodate the burst 120 of interval 116. As such, the system 30 may balance out the total processor usage 120 and 122 over the span of multiple intervals 112, 122, 116, 118. While only four intervals 112, 114, 116, 118 are shown in FIG. 4, one skilled in the art will appreciate that multiple additional intervals may be used during a burst and subsequent balancing applications.

Figure 5:
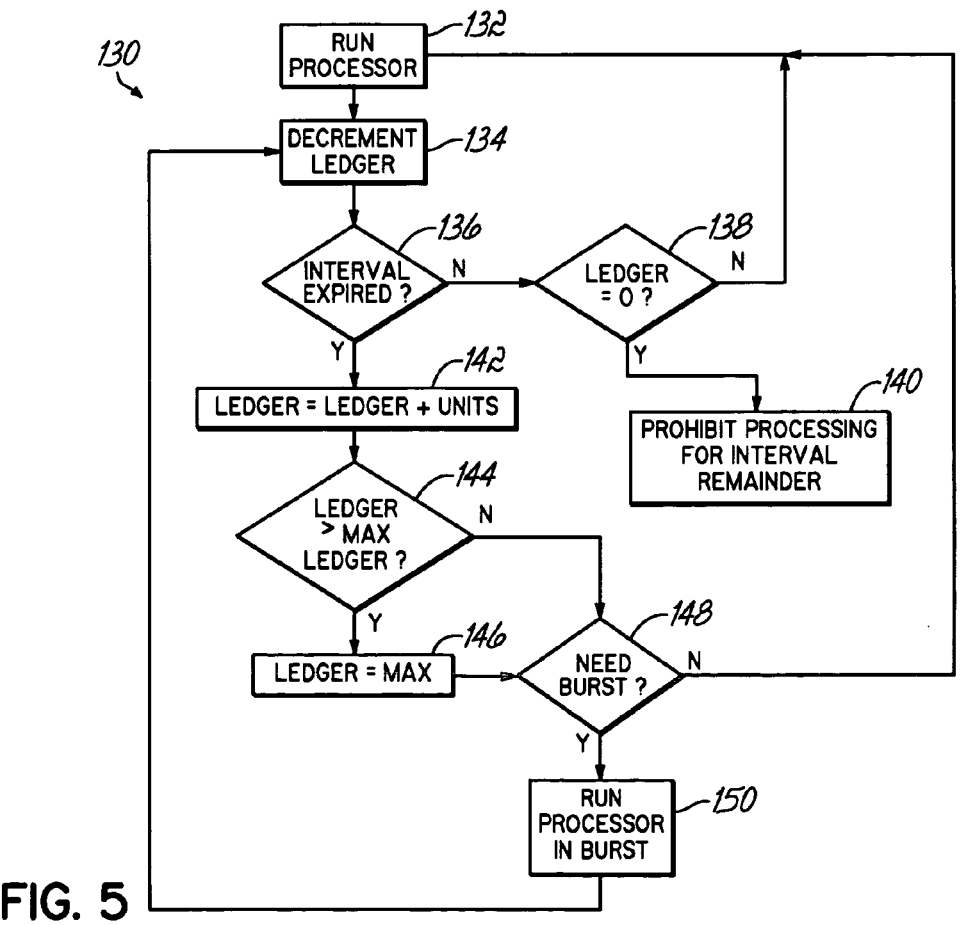
FIG. 5 is a flowchart having a set of steps executable by the hypervisor of FIG. 2 for enabling intervals of processor utilization while operating in burst mode that exceed normal limits.

FIG. 5 shows a flowchart 130 having a set of exemplary steps executable by the computer systems 10, 30 of FIGS. 1 and 2. The steps of the flowchart 130 are more particularly suited to those taken by the hypervisor 46 in enabling intervals of processor utilization that exceed normal limits during burst periods. The hypervisor 46 balances the burst operation by caching in a credit of processor time that was not used during previous intervals. This credit is maintained in the ledger 53.

The steps of the flowchart 130 of FIG. 5 may presume that the ledger 53 has already been set according to operating specifications. For instance, the ledger 53 may be set to a number corresponding to the number of processing units allocated to the system 30 during each interval. A processing unit corresponds to a percentage of active processor utilization relative to an interval. For instance, two milliseconds of a ten millisecond interval corresponds to two processing units.

Turning more particularly to block 132 of FIG. 5, the hypervisor 46 may allow the processor 12 to execute. According to the processor usage at block 132, the hypervisor 46 may decrement the ledger 53 at block 134 of FIG. 5. For instance, if the balance of the ledger 53 is initially set at two processing units, and one processing unit is used during the first interval 112 at block 132, then the balance of the ledger 53 is subtracted by one processing unit at block 134. The resultant ledger balance is one processing unit. While blocks 132 and 134 are shown in FIG. 5 as being separate steps, one skilled in the art will appreciate that the steps may be accomplished concurrently, i.e., dynamic leger updating.

The hypervisor 46 determines at block 136 whether the interval has expired. For instance, ten milliseconds may have passed since an interval was begun back at block 132. One skilled in the art will appreciate that the interval of other embodiments consistent with the invention may be preset to any length suitable for application specifications. Where the hypervisor 46 determines at block 136 that the interval has not expired, the hypervisor 46 may determine the balance of the ledger 53 at block 138.

If the balance of the ledger 53 is equal to zero at block 138, then the hypervisor 46 may prohibit at block 140 processing for the remainder of the interval 112. Where the ledger 53 alternatively has a positive balance of processor units at block 138, the hypervisor 46 may allow at block 132 the processor 12 to continue to execute.

After the interval 112 has expired at block 136, a new interval 114 begins at block 142. The hypervisor 46 may update the balance of the ledger 53 by adding regularly allocated processing units to any remaining balance in the ledger 53. For instance, if one processing unit remained in the ledger 53 at block 134, then that unit would be added at block 142 to two processing units that may be regularly allocated to an interval for a total of three units in the ledger 53.

With a ledger 53 having a balance greater than the limit normally allocated to an interval, the system 30 is said to be operating in burst mode. That is, the system 30 has at its disposal the ability to enable a processor 12 for a period exceeding the normal limit of the interval.

The hypervisor 46 may determine at block 144 of FIG. 5 whether the ledger balance is greater than a maximum ledger ceiling. This ceiling, or reference value, at block 144 may be predetermined as a number, e.g., eight processing units, configured to prevent skewed usage of a processor 12. If the balance of the ledger 53 exceeds the ledger ceiling at block 144, then the balance of the ledger 53 will consequently be set to that ceiling at block 146. This feature prevents undue buildup of available processing units over a period of non-activity, e.g., overnight, that would subsequently allow too much processing.

In any case, the ledger 53 having a positive balance blocks 142 or 144 may carry forward the credit in the ledger 53. While thus operating in burst mode, the hypervisor 46 may determine at block 148 of FIG. 5 whether a burst is needed to handle a task. As discussed herein, the burst mode tasking dispatching queue 52 may include a list of eligible tasks. Such tasks eligible for burst mode operation typically comprise processor intensive tasks having strict time constraints.

Where such a burst is needed at block 148, then the hypervisor 46 may allow the processor 12 to exceed its normal, capped limits at block 150. For instance, if the balance of the ledger 53 at block 142 or 146 is eight processing units, then the processor 12 running in burst mode may execute for up to eight milliseconds of a ten millisecond interval. If the system 30 alternatively does not require burst mode utilization at block 148, then the hypervisor 46 may allow the processor to execute as normal back at block 132.

Figure 6:
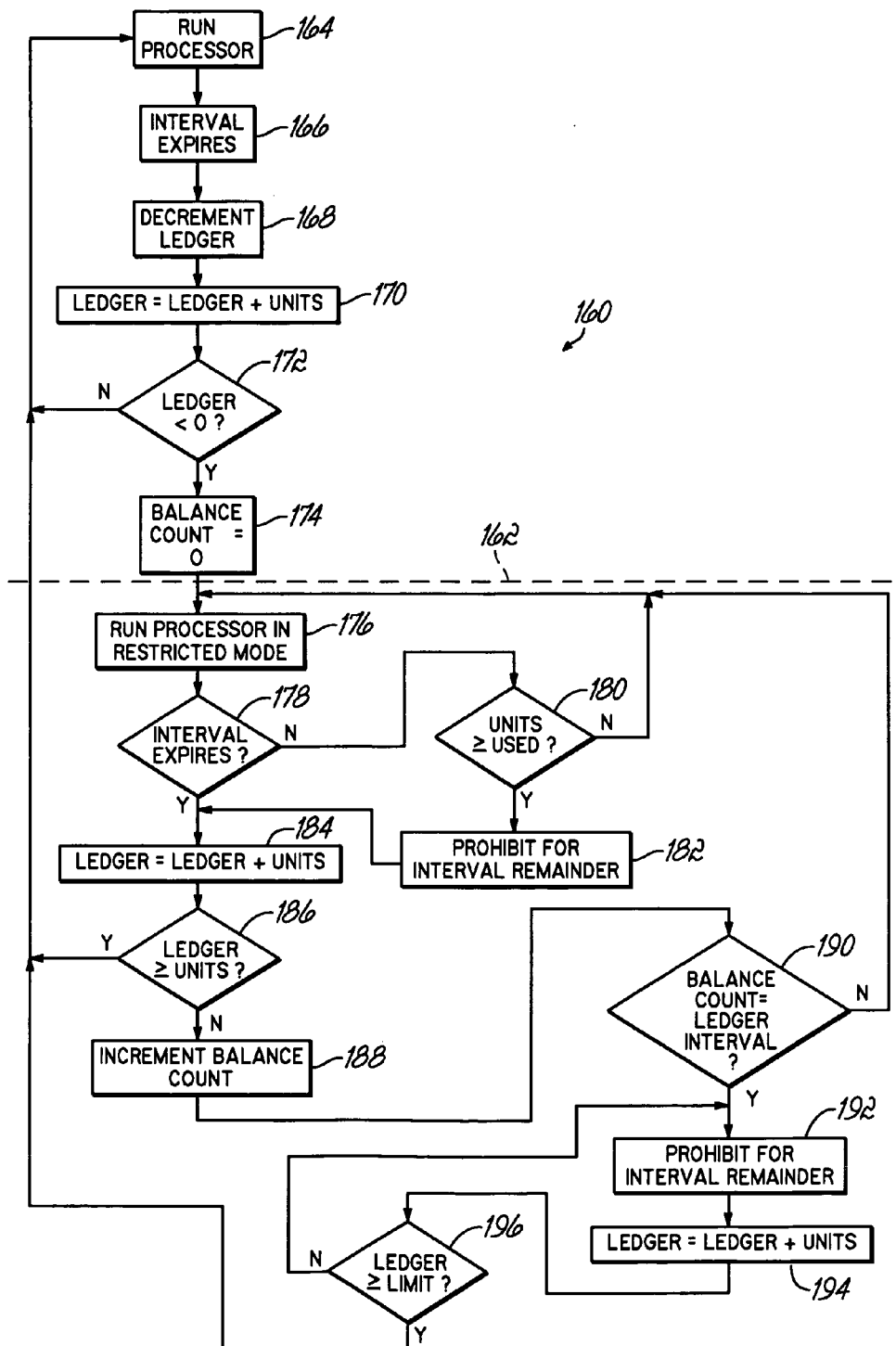
FIG. 6 is a flowchart having a set of steps executable by the hypervisor of FIG. 2 for allowing burst operations in the context of a processing unit deficit.

FIG. 6 is a flowchart 160 having a sequence of steps executable by the systems 10, 30 of FIGS. 1 and 2 for allowing burst operations in a deficit context. The flowchart 160 more particularly shows steps taken by the hypervisor 46 for allowing use of a processor 12 that exceeds a predetermined limit for an interval, and balances the otherwise excessive usage by borrowing from processing units of future intervals. As such, steps of the flowchart 160 above the dashed line 162 may be associated with burst, or unrestricted mode. Steps of the flowchart 160 below the dash line 162 may correspond to operation of the system 10 in a restricted mode.

As with the flowchart 130 of FIG. 5, the flowchart 160 of FIG. 6 may presume that the ledger 53 has been set to a predetermined amount. This predetermined amount may correspond to a number of processing units normally allocated to an interval when not operating in burst mode. This ledger 53 may be set in the factory, or by an administrative or salesperson. In one example, a user may purchase a "0.20 processor model," meaning that the purchased system 30 has a processor 12 that will generally operate at about twenty percent capacity. This designation would conventionally mean that a processor 12 could only operate for a maximum period of twenty percent of a given interval. An embodiment consistent with the present invention, however, allows a processor 12 to exceed this predetermined limit for a given interval, while preserving aggregate usage to twenty percent by using processor units from a ledger debit or credit.

Accordingly, the hypervisor 46 allows the processor 12 to run in unrestricted mode at block 164 of FIG. 6 until the interval expires at block 166. Processor usage at block 164 may include exceeding the normal predetermined limit while in unrestricted mode. For example, the hypervisor 46 may allow eight processing units of usage at block 164, even though the normal capped, predetermined limit for an interval is only two processing units. Since the system 10 is operating in deficit mode, the system does not have a credit of unused units/processor time built up prior to the usage of block 164.

The hypervisor 46 decrements the ledger 53 at block 168 according to the processor usage at block 164. While blocks 164 and 168 are shown in FIG. 6 as being separate steps, one skilled in the art will appreciate that the steps may be accomplished concurrently, i.e., dynamic leger updating.

The hypervisor 46 then updates the ledger balance at block 170. For instance, if the ledger 53 originally had two processing units in it before ten processing units (one hundred percent usage) were used at block 164, then the resultant ledger balance of negative eight will have two processing units (corresponding to the new interval allocation) added to it at block 170 for a total of negative six processing units.

At some point the hypervisor 46 checks the ledger balance at block 172 to determine if the balance is negative. If the balance of the ledger 53 is positive at block 172, then the hypervisor 46 allows the processor 12 to continue to run in unrestricted mode at block 164. If the ledger 53 alternatively has a negative balance at block 172, then the hypervisor 46 will set a balance count 54 to zero at block 174.

The hypervisor 46 may then allow the processor 12 to run in restricted mode at block 176. While operation in restricted mode at block 176 typically translates into limiting processor usage to the predetermined limit of the original ledger setting, e.g., two processing units per interval, more or less severe restrictions may alternatively be used. The processor 12 may execute at block 176 until the interval expires at block 178, or the processing units allocated in restricted mode are used at block 180. Where the processing units are used in block 180, the hypervisor 46 may prohibit further use of the processor 12 until the interval has expired at block 182. Where the interval has expired at block 178, the hypervisor 46 may at block 184 determine a new balance for the ledger 53. Namely, the current ledger balance will be added to the newly allocated processing units.

Should the new ledger balance at block 186 be greater than or equal to the predetermined limit, then the hypervisor 46 may allow the processor 12 to run in unrestricted mode at block 164. Where the ledger balance remains negative at block 186, then the hypervisor 46 may increment the balance count 54 at block 188. The balance count 54 may be compared at block 190 to a ledger interval 55. The ledger interval 55 is a predetermined number corresponding to the number of iterations in a balancing cycle that the system 30 may have to achieve balance without more severe restrictions. To that end, the hypervisor 46 may allow the processor 12 to continue to run at block 176 until the balance count 54 equals the ledger interval 55, e.g., five, at block 190.

Where the balance count 54 equals the ledger interval 55 at block 190, the hypervisor 46 may prohibit some or all processor usage at block 192, and until the addition of processing units through the occurrence of intervals at block 194 makes the ledger balance equal to or greater than the limit at block 196. Once this balance is achieved at block 196, the hypervisor 46 may allow the processor 12 to run in unrestricted mode at block 164.

While the present invention has been illustrated by a description of various embodiments and while these embodiments have been described in considerable detail, it is not the intention of the applicants to restrict, or in any way limit, the scope of the appended claims to such detail. As such, additional advantages and modifications will readily appear to those skilled in the art. For example, processes consistent with the invention may apply at the partition level, i.e., capped and uncapped partitions. For any time interval, a partition may have access to a maximum of, for instance, twenty-five percent of the processor. In an uncapped partition, the partition will be guaranteed to at least twenty-five percent of the partition if it needs it. An uncapped partition may steal cycles from other partitions running on the processor if the processors are not utilizing the processor during their designated slots. The partition is capped over the ledger interval, but uncapped during the interval. This ledger interval can fluctuate is size, depending upon the type of activity performed. If the processor is in long burst (indicative of a involved and time-critical task), the ledger interval will grow in size. If the processor is in short burst or is performing batch processing, the ledger interval will shrink relatively in size.

While the above-described embodiments have particular application in the context of processor utilization, one skilled in the art will appreciate that other computing resources, such as memory, may be similarly managed according to the burst features of the present invention. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method managing use of a computer resource, the method comprising, in a hardware-implemented computer:
   determining an actual use of the computer resource for a first interval, wherein the computer resource comprises a processor, and wherein the actual use of the computer resource corresponds to an amount of active processor utilization relative to the first interval; adjusting according to the determined actual use an available use of the computer resource during a second interval, wherein the adjusted available use corresponds to an available amount of processor utilization for the computer resource during the second interval;
   enabling use during the second interval of the computer resource according to the adjusted available use, wherein enabling the use during the second interval further includes exceeding a normal interval usage limit;
   using a ledger to maintain a balance associated with at least one of resource usage and resource availability;
   adjusting the balance of the ledger according to the determined actual use;
   comparing the balance of the ledger to a reference value to determine future resource usage, wherein the reference value may comprise a processing unit allocation for an interval or a balance count; and
   restricting the future resource usage according to the comparison.

2. The method of claim 1, further comprising limiting the use during the second interval according to a ledger balance.

3. The method of claim 1, wherein determining the actual use for the first interval further includes determining the actual use for an interval that precedes the second interval.

4. The method of claim 1, further comprising maintaining at least one of a ledger interval and a balance count used to balance the ledger.

5. The method of claim 4, further comprising comparing the balance count to the ledger interval.

6. The method of claim 5, further comprising restricting future resource usage to a level ranging from zero usage to a normal interval limit for a next occurring interval in response to comparing the balance count to the ledger interval.

7. The method of claim 1, wherein determining the actual use further includes determining the actual use of the resource for a first partition, and wherein the available use is adjusted with respect to a second partition.

8. An apparatus comprising:
   a computer resource configured to be used up to a normal interval usage limit, wherein the computer resource comprises a hardware-implemented processor; and
   program code in communication with the computer resource, the program code configured upon execution to determine an actual use of the computer resource for a first interval, to adjust according to the determined actual use an available use of the computer resource during a second interval, and to enable use during the second interval of the computer resource according to the adjusted available use, wherein the actual use of the computer resource corresponds to an amount of active processor utilization relative to the first interval, wherein the adjusted available use corresponds to an available amount of processor utilization for the computer resource during the second interval, and wherein the program code is further configured to use a ledger to maintain a balance associated with at least one of resource usage and resource availability, adjust the balance of the ledger according to the determined actual use, compare the balance of the ledger to a reference value to determine future resource usage, wherein the reference value may comprise a processing unit allocation for an interval or a balance count, and restrict the future resource usage according to the comparison, wherein the use during the second interval exceeds the normal interval usage limit.

9. The apparatus of claim 8, wherein the first interval precedes the second interval.

10. The apparatus of claim 8, wherein first interval is subsequent to the second interval.

11. The apparatus of claim 8, further comprising at least one of a ledger interval and a balance count used balance a ledger.

12. The apparatus of claim 11, wherein the program code is further configured to initiate comparing the balance count to the ledger interval.

13. The apparatus of claim 12, wherein the program code is further configured to initiate restricting future resource usage to a level ranging from zero usage to a normal interval limit for a next occurring interval in response to comparing the balance count to the ledger interval.

14. A non-transitory computer readable medium storing:
   program code configured upon execution to determine actual use of a computer resource for a first interval, to adjust according to the determined actual use an available use of the computer resource during a second interval, and to enable use during the second interval of the computer resource according to the adjusted available use, wherein the computer resource comprises a processor, wherein the actual use of the computer resource corresponds to an amount of active processor utilization relative to the first interval, wherein the adjusted available use corresponds to an available amount of processor utilization for the computer resource during the second interval, and wherein the program code is further configured to use a ledger to maintain a balance associated with at least one of resource usage and resource availability, adjust the balance of the ledger according to the determined actual use, compare the balance of the ledger to a reference value to determine future resource usage, and restrict the future resource usage according to the comparison, wherein the reference value may comprise a processing unit allocation for an interval or a balance count, wherein the use during the second interval exceeds the normal interval usage limit.

15. The method of claim 1, further comprising adding a first plurality of units to the balance of the ledger during each of a plurality of intervals, and wherein adjusting the balance of the ledger according to the determined actual use including decrementing the balance of the ledger by a second plurality of units according to the determined actual use, wherein each unit corresponds to a percentage of active processor utilization relative to each interval.

16. The method of claim 1, wherein enabling use during the second interval of the computer resource according to the adjusted available use includes enabling use of the computer resource for a plurality of processor cycles during the second interval.

17. The apparatus of claim 8, wherein the program code is configured to add a first plurality of units to the balance of the ledger during each of a plurality of intervals, and adjust the balance of the ledger according to the determined actual use by decrementing the balance of the ledger by a second plurality of units according to the determined actual use, wherein each unit corresponds to a percentage of active processor utilization relative to each interval.

18. The apparatus of claim 8, wherein the program code is configured to enable use during the second interval of the computer resource according to the adjusted available use by enabling use of the computer resource for a plurality of processor cycles during the second interval.

* * * * *